United States Patent Office 3,311,537
Patented Mar. 28, 1967

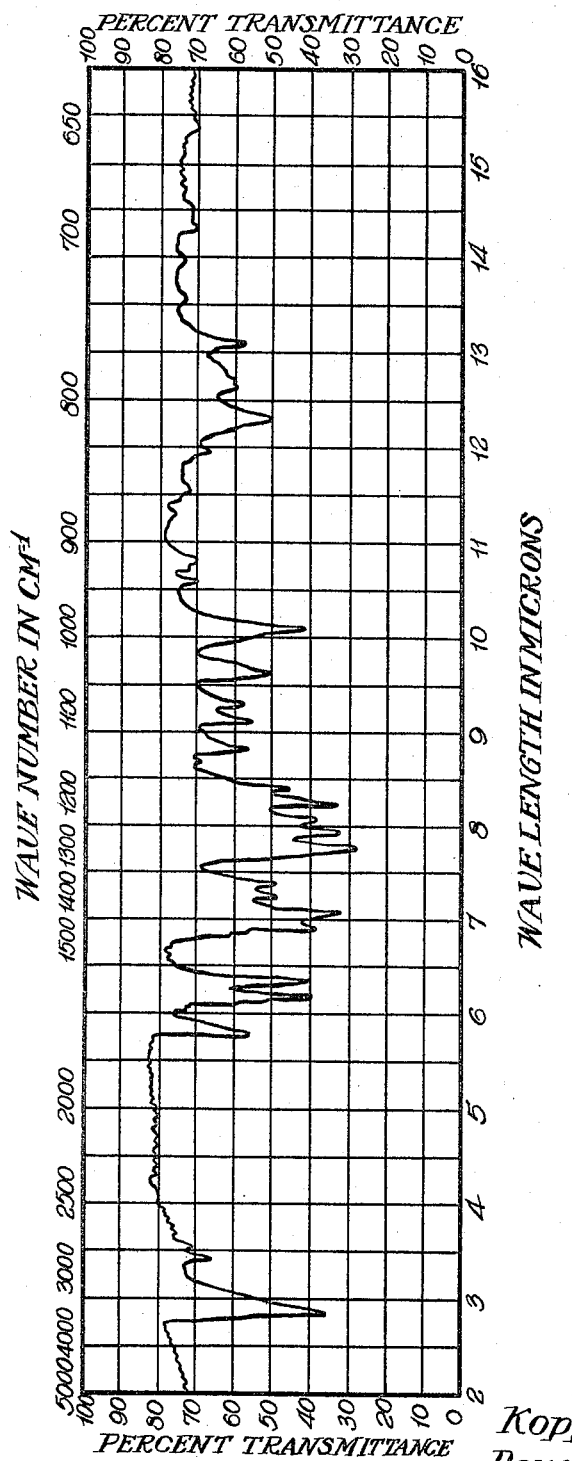

3,311,537
ROSEOLIC ACID AND METHOD OF PREPARING SAME
Koppaka V. Rao, Pinebrook, Donald W. Renn, River Vale, and William S. Marsh, Wanaque, N.J., assignors to Chas. Pfizer & Co., Inc., New York, N.Y., a corporation of Delaware
Filed Oct. 26, 1962, Ser. No. 233,400
7 Claims. (Cl. 167—65)

This invention relates to the cultivation under controlled conditions of a newly discovered strain of microorganism, to the biologically active substance produced thereby, and to methods for the recovery and concentration from crude solutions, including fermentation broths, of the biologically active substance produced by this microorganism.

This application is a continuation-in-part of our copending United States Patent application Ser. No. 39,727, filed June 29, 1960 and now abandoned.

This invention relates specifically to the fermentation product roseolic acid, in both its crude and purified forms, and to methods for the preparation, concentration and isolation of this substance. Roseolic acid is highly effective in inhibiting the growth of malignant tumors in animals. It is especially active against adeno carcinoma 755, HS #1, and highly cytotoxic to HeLa cells in tissue culture.

The newly discovered strain of microorganism employed in the valuable process of this invention was isolated on an agar formulation from soil samples and was recognized as being unlike commonly encountered antibiotic producing species.

The culture was examined and found to be a strain of a streptomycete. It was, therefore, planted onto media commonly used for the identification of streptomycetes and was grown at appropriate temperatures on the different media for periods ranging up to one month. Observations were made at proper intervals for the growth and behavior of the culture on different media, and a final record was made of the appearance of the culture at the end of two weeks and for some media at the end of three weeks and one month.

In some cases the color of the colony or of the soluble pigment was described by the use of Ridgway's Color Standards and Nomenclature. The description of the culture is given in Table I.

In the process of identifying culture BA–15934 it was noted that of all of the species of the genus Streptomyces the one species that most closely approximated this strain is the one described by Gauze in his book "Problems in the Classification of Antagonistic Actinomycetes," English edition (1959), as *Actinomyces griscoruber* Gauze. Comparison of the description of BA–15934 with that of the organism described by Gauze revealed that the two cultures were different. In Table II there is presented a comparison of the differences between this culture and *A. griseoruber*.

Because BA–15934 cannot be identified as any species now known in the genus Streptomyces it is concluded to be a new species. The name proposed here for this new species is *Streptomyces pulcher* sp. nov. The type culture is designated to be BA–15934.

TABLE I.—CULTURE CHARACTERISTICS OF *STREPTOMYCES PULCHER*, SP. NOV., ISOLATE BA-15934

| Medium | Amount of Growth | Color | | Remarks |
|---|---|---|---|---|
| | | Aerial Mycelium and Spores | Soluble Pigment | |
| Glucose asparagine agar. | Good, naked pale cream color. | Lacking | Lacking | Reverse pale cream color. |
| Synthetic agar | Good, flat | Gray | do | Colorless but at first appearing grayish because of heavy sporulation on a thin layer of growth. |
| Gauze's medium #1 | Moderate | Gray (near Ridgway's Castor Gray). | do | Reverse rosy brown (near Ridgway's Vinaceous Drab); chains of spores scattered along hyphae or in clusters; chains in the form of hooks, loops and true spirals. |
| Calcium malate agar | do | Greenish-gray (near Ridgway's Artemisia Green) in narrow bands near the edge of growth or all over surface of isolated small colonies; other colonies thin and appearing light pink from the pinkish vegetative mycelium; with some light gray spots. | do | Reverse pink-rose; malate digested. |
| Cellulose | Growth good on cellulose strip above liquid. | Light pink but becoming gray near liquid. | do | |
| Skimmed milk (1 month). | Moderate in the form of a white to pink pellicle. | Lacking | Pinkish soluble pigment in the peptonized portion. | No coagulation until the 21st day, coagulation and peptonization complete in 30 days; previous to 21 days apparently only hydrolysis. pH changed from 6.6 to 6.7–6.9. |
| Potato plug | Growth excellent | Pink to light gray | Lacking | Vegetative mycelium pale pink to buff. |
| Nutrient agar | Poor to moderate | Moderate, white | do | Reverse pink (near Ridgway's Deep Rose Pink). |
| Glucose agar | Excellent, somewhat pebbly surface. | White | do | Reverse buff with slight pink tint. |
| Emerson's agar | Excellent | Light gray (near Ridgway's Pale Mouse Gray to Pallid Quaker Drab). | do | Reverse colorless to grayish. |
| Pridham's yeast extract agar. | Excellent, thick | Gray (near Ridgway's Deep Grayish Olive in darker parts, grading into Light Olive Gray). | do | Reverse brownish (near Ridgway's Pecan Brown and Rood's Brown). Spores in chains that were in hooks or loops or open spirals, borne singly or in clusters; spores examined under oil in situ appearing oblong with truncate ends and spaces between them, 1.5–1.8 x 1.3$\mu$. Strained slide of spores revealed them to be mostly 2.0 x 1.0–1.3$\mu$, oblong with rounded ends, but some were round, 1.5 $\mu$ wide and some were cylindrical with square ends, 2.5 x 1.3$\mu$. |

TABLE I—Continued

| Medium | Amount of Growth | Color | | Remarks |
|---|---|---|---|---|
| | | Aerial Mycelium and Spores | Soluble Pigment | |
| Hickey and Tresner's agar. | Excellent, thick | Gray (near Ridgway's Storm Gray and Castor Gray). | ....do.... | Reverse grayish brown. |
| Gelatin | Good | Good, Dark gray (near Ridgway's Dark Mouse Gray). | ....do.... | Reverse dark gray, nearly black; zone of liquefaction 1″ beyond edge of colony (good liquefaction). |
| Starch agar | Poor, white, below surface. | Lacking | ....do.... | Zone of hydrolysis moderate. |
| Organic nitrate broth (3 weeks). | Pellicle of pink vegetative mycelium. | White | | No nitrites produced from nitrates even after 13 days. |
| Inorganic nitrate broth (3 weeks). | Whitish growth on bottom of tube. | | | Nitrites produced from nitrates after only 6 days of incubation. |
| Peptone iron agar | | | | No hydrogen sulfide produced. |

TABLE II

| Medium | A. griseoruber | BA-15934 |
|---|---|---|
| Gauze's mineral medium #1 | Light gray aerial mycelium | Dark gray. |
| Do | Substrate mycelium red | Substrate mycelium pink. |
| Milk | Mycelium red; medium not pigmented | Mycelium pink, medium pigmented pink in peptunized portion. |
| Gelatin | Liquefied slowly or not at all | Good liquefication. |
| Starch agar | Hydrolyzed weakly or not at all | Moderate hydrolysis. |
| Potato | Aerial mycelium light gray | Aerial mycelium pinkish to light gray. |
| Cellulose | No growth | Good growth. |

Cultures of the newly discovered microorganism, identified in the culture collection of Chas. Pfizer & Co., Inc., as Isolate BA–15934, have been deposited with the American Type Culture Collection and given ATCC No. 13849. The culture was described and classified by Dr. John B. Routien.

The present invention embraces the process for growing Isolate BA–15934 under controlled conditions to produce roseolic acid. Biologically active filtrates are satisfactorily prepared via submerged fermentation in the usual type of complex natural media. Typical of such media are aqueous nutrient media containing 1% of glucose, 1.5% of soybean meal, 0.5% of dipotassium phosphate, 0.2% of sodium chloride, and 0.5% of distiller's solubles; or 1% of maltose, 0.5% of tryptone, 0.1% of potassium acid phosphate, 0.1% of sodium chloride and 0.02% of ferrous sulfate heptahydrate. The media are adjusted to pH 7.0 before autoclaving. Inocula may be either spore suspensions or preformed growth of the organism. Fermentation is carried out at 28° C., either by shake culture or small pot fermentations, mechanically aerated, for from about 50–80 hours.

A wide variety of fermentation media have been tested and found to be satisfactory. A media composed basically of a source of nitrogen, of a carbohydrate, and of minerals is required. Satisfactory nitrogen sources include myriad proteinaceous materials such as hydroylzed casein of various types, soybean meal, casein, distiller's solubles, corn meal, etc. Suitable carbohydrate sources are dextrose, glycerol, dextrin, starch, etc. Less satisfactory results are obtained on lactose-corn steep mixtures. The preceding materials frequently contain sufficient minerals to satisfy the mineral requirements of the organism without the addition of substantial additional mineral components.

For the commercial production of roseolic acid, submerged culture in the usual type of equipment familiar to those skilled in the art is employed. Suitable tanks vary in size from 2000 gal. to 20,000 gal. or more and are equipped with efficient agitators and means for aseptic aeration of the contents with up to two or more volumes of air per minute. A satisfactory medium for large scale production is given above. The growth of the microorganism and antitumor agent production usually reach their maximum after about 50 to 80 hours at 28° C. However, variation in the equipment used, the rate of aeration, stirring, and so forth frequently affect the time period for maximum activity to be reached. A period of at least about 24 hours is required in any case. Aeration of the medium on submerged growth is maintained at the rate of about ½ to 2 volumes of air per volume of broth per minute. Aseptic conditions, of course, must be maintained throughout the transfer of the inoculum, and the growth of the microorganism. Removal of the mycelium and recovery of the antitumor agents is carried out as described below.

The broth shows some antibiotic activity although this does not appear to be responsible for the antitumor activity.

A satisfactory level of antitumor activity, as determined by tissue culture studies, is attained following a 50–80 hour fermentation. The broth is then filtered and the filtrate stirred with 1–2% by weight of fuller's earth at pH 2.0–4.0. The mixture is filtered, the filter cake washed with 0.001 N HCl and the activity eluted with 1% phosphate buffer, pH 7.0–7.5. Two elutions give essentially all the activity. The eluate is concentrated to about 10%–20% solids, dialyzer to remove the major portion of inorganic ions, then passed through a column of diethylaminoethylcellulose which absorbs most of the activity. The column is washed with 0.1% phosphate buffer (pH 7.0) which removes colored, inactive materials. The activity is then eluted with 0.1 M phosphate buffer, pH 7.0, containing 4% sodium chloride.

The operation of the column is followed by optical density readings at 256 and 245 m$\mu$, and by tissue culture activity versus HeLa cells against which the material is highly cytotoxic.

The crude product thus obtained is purified further by concentration to about 20% solids followed by dialysis. The dialyzed concentrate is stirred with a mixture of 1:1 silicic acid and cellulose and the pH adjusted to 2.0. The mixture is then put on a column of silicic acid:cellulose (1:1, prepared in 0.1% phosphate buffer at pH 2.0) containing ten times the amount added to the dialyzed concentrate. Successive elution therefrom with phosphate buffers at pH 2.0, 4.0 and 7.0 removes the active material. The bulk of the active material is eluted at pH 4.0. About 10% of the total activity is eluted by each of the other two buffers.

The active fractions thus obtained at each pH level are further purified by concentration and dialysis. Each of the concentrates is treated with an equal volume of a water-miscible solvent such as methanol, acetone, or dioxane, and filtered. The filtrates are acidified and the red solid which precipitates out filtered. The solution and precipitation process is repeated.

In a variation of the recovery procedure, the filtered broth is adjusted to pH 2.0, stirred with supercel and filtered. A major portion of the activity is precipitated, especially from a broth of relatively high activity. The precipitate is separated and extracted with phosphate buffer pH 7.0–7.5 and processed as before. The quality of the product is somewhat better by this procedure.

The active material can also be extracted with phenol under acid conditions. This is of advantage during the purification.

The three fractions eluted from the silicic acid-cellulose column at pH levels of 2, 4 and 7 are qualitatively alike in their physical properties. They have the same electrophoretic mobility. A mixture of the three cannot be separated on a similar column. It is believed that the three represent the same compound, roseolic acid. At pH 2.0, most of the substance is precipitated and what little is in solution appears in the effluent. When the pH is raised to 4.0 or higher, the compound dissolves and appears in the effluent.

Roseolic acid is a ruby red, weakly acid amorphous powder which melts with decomposition at 185°–195° C. It is only slightly soluble in water and almost insoluble in most common organic solvents. Its solubility in water is increased considerably at pH values of 7.0 or higher although at pH values of above 8.0 rapid decomposition occurs. Its water solubility is enhanced by the presence of sodium chloride or glucose. It is red in acidic or neutral solutions and blue in alkaline solutions. If an alkaline solution is neutralized immediately the red color is regenerated. In concentrated sulfuric acid is gives a magenta color. It gives a negative reaction with ninhydrin and with ferric chloride and a positive Molisch test. The presence of a reversible oxidation-reduction system is demonstrated when aqueous solutions of roseolic acid are treated with sodium hydrosulfite. The light yellow to colorless solution produced becomes red upon shaking with air. It contains carbon, hydrogen, nitrogen, phosphorus and oxygen in the following proportions: (average values of two analyses)

Found: C, 37.25; H, 4.94; N, 11.80; P, 8.01; O (by difference), 38.00.

Titration with sodium hydroxide shows an equivalent weight of 1520±100.

The ultraviolet spectrum of roseolic acid in pH 7.0 phosphate buffer shows maxima of 256 and 500 m$\mu$ respectively with $$E_{1\,cm.}^{1\%}$$

values of 190±10 and approximately 2, respectively. The infrared spectrum when measured in a KBr pellet containing 1% of the compound exhibits broad absorption in the hydroxyl and carbonyl regions.

Pure roseolic acid when subjected to electrophoresis in 0.02 N phosphate buffer at pH 7.0 at 250–300 volts and 180±10 milliamperes migrates towards the anode in a single sharp band.

When roseolic acid is heated with 1 N hydrochloric acid at 100° C. for 3 to 5 minutes a red precipitate which can be extracted into chloroform is produced. The product can be obtained as a bright red crystalline solid, melting point 238°–240° C. by recrystallization from chloroform-methanol (1:1). It is almost insoluble in water but soluble in organic solvents. It shows no activity against HeLa cells in tissue culture.

*Analysis.*—Found: C, 63.35; H, 4.70.

Its molecular weight determined by the method of Rast using camphor as solvent, is 477. Its empirical formula calculated from this data is $C_{24}H_{22}O_9$: C., 63.43; H, 4.88; calculated molecular weight 454. Its ultraviolet spectrum when measured in methanol shows major maxima at 232, 250, 285 and 500 millimicrons with $$E_{1\,cm.}^{1\%}$$

values of 935, 710, 180 and 310, respectively. Its infrared spectrum determined in a KBr pellet containing ⅓% of the product (FIGURE I) shows maxima at 3436, 2899, 1712, 1610, 1575, 1439, 1408, 1374, 1351, 1285, 1256, 1236, 1206, 1188, 1124, 1088, 1073, 1040, 989, 943, 928, 921, 836, 813, 790 and 763 reciprocal centimeters.

This hydrolysis product gives a dark green color with alcoholic ferric chloride, a bright magenta color with concentrated sulfuric acid and a blue color with aqueous hydroxide. It also possesses a reversible oxidation-reduction system as evidenced by its similar behavior with sodium hydrosulfite and air. The hydrolysis product when heated further with 6 N hydrochloric acid for several hours gives a positive ninhydrin reaction.

Roseolic acid is the main component produced by Isolate BA–15934. It appears that other antitumor agents are also produced during fermentation of BA–15934, although in much smaller amounts.

It is to be understood that for the production of roseolic acid according to the present invention, limitation to the aforesaid organism is not intended. It is especially desired and intended to include mutants produced from this strain of this organism by various means such as irradiation with X-rays or ultraviolet light, treatment with nitrogen mustards, single cell culture techniques and the like; and any organism, regardless of its appearance or physiological behavior, which may be developed by means of transformation, transduction, genetic recombination or some other genetical procedure using a nucleic acid from the herein described species, whereby it has acquired the ability to produce the elaboration product here described or to carry on the biochemical change here described.

Roselic acid is remarkably effective in treating a number of different types of malignancies and exhibits high specificity against tumors. For this purpose, either the pure crystalline material may be administered or one of the crude forms of the valuable product may be employed. This includes either a filtered fermentation broth prepared from Isolate BA–15934 or a solid or liquid concentrate obtained therefrom. Such preparations should be of sufficient potency to provide a daily dose to the host equivalent to at least about 0.1–5.0 mg./kg. of body weight of pure roseolic acid. In order to do this, a concentration of the active ingredient in the carrier of at least about 0.0001% is necessary. For purposes of administration, a nontoxic carrier of course, is selected. By nontoxic is meant a carrier which is nontoxic when administered in a quantity sufficient to provide the above dose of antitumor agent. This may be either a pharmaceutical carrier, either a liquid or a solid such as water, aqueous ethanol, syrup, isotonic saline or glucose, starch, lactose, calcium phosphate, etc., an animal feed stuff, or a mixture of various materials as occurs in a filtered fermentation broth. Either oral or parenteral administration is satisfactory. The parenteral route is perhaps preferred until a satisfactory regimen adapted to the tumor bearing host is developed.

To illustrate the antitumor activity of roseolic acid, the percent inhibition of CA–755 tumors in mice is presented in Table III.

The tests reported herein were carried out according to the protocols of Cancer Chemotherapy National Service Center, National Cancer Institute—National Institutes of Health, Bethesda, Md., October 1958 as set forth in "Specifications for Screening Chemical Agents and Natural Products Against Animal Tumors."

TABLE III.—THE ACTIVITY OF ROSEOLIC ACID AGAINST CARCINOMA 755

| Dose, mg./kg. | No. of Treatments | Route | Survival Rate | Percent Inhibition |
|---|---|---|---|---|
| 0.05 | 11 | I.P. | 9/10 | 56 |
| 0.10 | 11 | I.P. | 9/10 | 87 |
| 0.125 | 11 | I.P. | 10/10 | 93 |

Further evaluation against carcinoma 755 was conducted by administering a crude sample containing 10% of active ingredient at various time intervals and by various routes. The value in the column headed "Dose-Mg./Kg." is not based on the concentration of active ingredients therein. It represents the total weight of the crude concentrate, containing 10% by weight of roseolic acid. The data are presented in Table IV.

TABLE IV.—The ACTIVITY OF ROSEOLIC ACID VS. CARCINOMA 755 AT VARIOUS TIME INTERVALS AND BY VARIOUS ROUTES

| Dose, mg./kg. | No. of Treatments | Route | Survival Rate | Percent Inhibition |
|---|---|---|---|---|
| 1.5 | 11 | I.P. | 10/10 | 82 |
| 2 | 11 | I.M. | 10/10 | 81 |
| 2 | 11 | I.P. | 10/10 | 87 |
| 3 | 11 | I.P. | 10/10 | 98 |
| 4 | 11 | S.C. | 10/10 | 96 |
| 4 | 11 | I.M. | 9/10 | 98 |
| 4 | ¹6 | I.P. | 10/10 | 92 |
| 4.5 | ²4 | I.P. | 10/10 | 91 |
| 6 | ²4 | I.P. | 9/10 | 92 |
| 4 | ³6 | I.P. | 9/10 | 87 |
| 6 | ³6 | I.P. | 8/10 | 94 |
| 8 | ⁴3 | I.V. | 9/10 | 85 |
| 10 | ⁵2 | I.P. | 9/10 | 87 |

¹ EOD Treatment given other day.
² E₃D Treatment given every third day.
³ Treatment started on day 6 on established tumor.
⁴ Treatment given on days 1, 4, 8 after implantation.
⁵ Treatment given on days 1 and 6 after implantation.

Further evidence of the potent antitumor activity of the valuable product of this invention is given in Table V wherein the activity of various crude concentrates is reported. Runs numbers 1, 2 and 3 were run on filtered broths subjected to no purification other than dialysis. Runs 4–7 were carried out with a concentrate obtained by elution of the adsorbed active ingredients from fuller's earth followed by freeze drying of the eluate. Runs 8–10 were made using the product obtained by elution of the diethylaminoethylcellulose adsorbed material.

TABLE V.—ANTITUMOR ACTIVITY OF VARIOUS CRUDE CONCENTRATES OF ROSEOLIC ACID

| Run | Dose, mg./kg. | No. of Treatments | Route | Survival Rate | Percent Inhibition |
|---|---|---|---|---|---|
| 1 | 75 | 11 | I.P. | 10/10 | 95 |
| 2 | 75 | 11 | I.P. | 8/10 | 98 |
| 3 | 37.5 | 6 | I.P. | 9/10 | 81 |
| 4 | 7.5 | 11 | I.P. | 10/10 | 73 |
| 5 | 7.5 | 6 | I.P. | 10/10 | 75 |
| 6 | 7.5 | 6 | I.P. | 10/10 | 70 |
| 7 | 12.5 | 6 | I.P. | 10/10 | 90 |
| 8 | 3.75 | 11 | I.P. | 10/10 | 72 |
| 9 | 6.25 | 11 | I.P. | 10/10 | 73 |
| 10 | 1.5 | 6 | I.P. | 10/10 | 86 |

The "Dose mg./kg." column is based on the total solids content administered, not on the concentration of the active ingredient.

Even the crude concentrate is thus seen to be a potent antitumor agent. When administered at dosages of from 1 to 3 mg./kg./day intra-peritoneally, tumor inhibitions of up to 98% are obtained. At proportionately higher dosage levels the product is also active when administered every other day or every third day with inhibitions of over 90% being obtained. Moreover, inhibition of established tumors is obtained. The prolonged action of the product is evidenced by the treatments given on days 1, 4 and 8 and 1 and 6 following implantation. High orders of activity are thus obtained by a variety of regimens and routes. Activity via the oral route of administration is somewhat lower than that via other routes. The oral activity is interesting in view of the non-dialyzable nature of the product.

Roseolic acid is highly cytotoxic to HeLa cells in tissue culture as determined by the procedure described by Toplin in Cancer Research, 19, 959 (1959). It has a cytotoxic endpoint (the concentration which produces significant sytotoxicity as indicated by rounding-up and detachment of the cells from the culture flask, cytoplasmic granulation and other pronounced morphological changes) of 0.02–0.04 γ/ml. and a lethal end-point (the concentration which produces complete cell destruction) of 0.1–0.2 γ/ml. This activity equals that of the highly cytotoxic Actinomycin D or Mitromycin C.

The cytotoxic activity of roseolic acid in tissue culture is not as rapid as with other antitumor agents; the drug appears to require 72–96 hours of drug-cell contact for development of full potency. This may be a reflection of the relatively large molecular size of the active component. However, cell destruction is rapid after 72–96 hours and the low ratio of 3:5 between cytotoxic and lethal concentrations indicates sharply defined endpoints of activity.

The activity of roseolic acid against HS #1 is readily determined by the procedure described by Toolan, Cancer Research, 13, 684 (1953).

TABLE VI.—ACTIVITY OF ROSEOLIC ACID AGAINST HS #1

| Dose, mg./kg. | Survival Rate | Percent Inhibition |
|---|---|---|
| 0.025 | 7/7 | 45 |
| 0.05 | 6/7 | 68 |

It is apparently quite non-antigenic in that sensitization of guinea pigs could not be demonstrated.

In the therapy of tumors roseolic acid can advantageously be used in combination with one or more other carcinostatic agents. For this purpose compositions containing from 10–90% of active ingredient of roseolic acid by weight are useful. Known carcinostatic agents which can be employed with roseolic acid in such compositions are the nitrogen mustard type carcinostats, 6-mercaptopurine, 8-azaguanine, urethane, 7-diazo-5-oxo-1-norleucine (DON), azaserine, triethylenemelamine, mitomycin C, triethylenephosphoramide, 1,4-dimethylsulfonyloxybutane, the carcinostatic folic acid analogs and the like.

The following examples are helpful to further illustrate the invention in detail. They are not, however, the sole embodiments, and are not considered to limit the scope thereof in any way.

EXAMPLE I

A nutriment medium having the following composition is prepared, adjusted to pH 7.0, and sterilized:

| Ingredient: | g./l. |
|---|---|
| Cerelose (dextrose hydrate) | 10.0 |
| Soybean meal | 15.0 |
| $K_2HPO_4$ | 5.0 |
| NaCl | 2.0 |
| Distiller's solubles | 2.5 |

Inoculum is prepared by transferring the growth of a well sporulated slant of Isolate BA–15934 to a portion of this medium and incubating for about 36–40 hours at 28° C. on a rotary shaker. The main batch of medium is then inoculated by mixing with 5% by volume of the inoculum so prepared. Aeration is effected at a rate of about 2 volumes of air per minute and efficient agitation is provided during incubation at 28° C. After 60 hours the beer is filtered.

Broths prepared in this fashion, when injected into mice bearing CA–755 tumors, consistently inhibit the tumor's growth to a significant degree.

EXAMPLE II

A fermentation broth is prepared as described in Example I and clarified by filtration. The filtered broth is stirred with 1–2% by weight of fuller's earth at pH 4.0. The mixture is filtered, the cake washed with 0.001 N HCl and the activity eluated with 1% phosphate buffer, pH 7.0–7.5. Two elutions give essentially all the activity. The eluate is concentrated to about 10% solids. The concentrate is then adsorbed on a column of diethylaminoethylcellulose on which almost all the activity is adsorbed. The column is washed with water, then with 0.1 M phosphate pH 7.0. This is followed by elution with 0.1 M phosphate (pH 7.0) containing 4% sodium chloride which brings in most of the activity. The operation of the column is followed by optical density readings at 256 and 245 m$\mu$. The pure material has a maximum at 256 m$\mu$. Fractions of better quality show not only high optical density but also higher values at 256 m$\mu$ compared to those at 245 m$\mu$. In addition, activity in tissue culture is used as a guide.

The active fractions are concentrated to about 20% solids, dialyzed and the non-dialyzable fraction brought to pH 2.0 and mixed with a mixture (1:1) of silicic acid and cellulose. This slurry is added to the top of a column made up of a ten-fold volume of the same mixture in 0.1% phosphate buffer, pH 2.0, and the column washed with more of the same buffer. After the initial dark colored effluent, there is obtained a reddish brown eluate with a characteristic optical density pattern as described above. Elution is continued with this buffer until this band is completely off the column. The column is then eluted with phosphate buffer, pH 4.0. The major portion of the active material comes off as a deep reddish pink band. The column is then eluted with phosphate buffer, pH 7.0 to give a third pinkish brown band.

The fractions from these three bands are concentrated separately, the pH adjusted to approximately 2.0 in each case and each treated with an equal volume of dioxane. The red precipitate form in each case is filtered and washed with 1:1 dioxane-water. Each of the solids is redissolved in water containing a small amount of sodium chloride (0.01%) and the precipitation repeated with dioxane. The three solid fractions thus obtained are qualitatively alike in their physical properties and are believed to be the same compound—roseolic acid.

EXAMPLE III

Following the procedure of Example II, but using the nutrient medium given below, antitumor agent roseolic acid is obtained:

Ingredient: g./l.
Maltose _____ 10
Tryptone _____ 5
KH$_2$PO$_4$ _____ 1
NaCl _____ 1
FeSO$_4$·7H$_2$O _____ 0.2

Adjust to pH 7.0 and sterilize.

EXAMPLE IV

A 0.0001% solution of roseolic acid, prepared as described in Example II, is aseptically prepared using isotonic saline as the vehicle. The solution thus obtained is satisfactory for parenteral use in the treatment of sensitive infections and tumors.

EXAMPLE V

A fermentation broth is prepared as described in Example I and aseptically filtered through a bacteriological filter to provide a sterile filtrate which is freeze dried. The dry residue is a composition containing about 0.1% by weight of roseolic acid.

EXAMPLE VI

The procedure of Example II is repeated with the exceptions noted. The activity is adsorbed from the filtered broth on fuller's earth at pH 2.0 rather than at pH 4.0. Further, the three fractions obtained by elution at pH 2.0, 4.0 and 7.0, respectively, are combined, concentrated and dialyzed. The nondialyzable fraction is treated with an equal volume of dioxane and acidified to pH 2.0. The red precipitate is filtered and the solution-precipitation step repeated. The roseolic acid product is filtered off, washed thoroughly with methanol and dried.

EXAMPLE VII

A fermentation broth, prepared as described in Example I, is clarified by filtration and adjusted to pH 2.0. The acidified broth is stirred with supercel, filtered and the precipitate extracted with phosphate buffer at pH 7.0–7.5. The solution thus obtained is concentrated to about 20% total solids and processed according to the procedure of Example II. The roseolic acid obtained is identical to that produced in Examples II and VI.

What is claimed is:

1. A process for the production of roseolic acid which comprises cultivating a strain of *Streptomyces pulcher*, ATCC No. 13849, in an aqueous nutrient medium containing a source of carbohydrate, a source of organic nitrogen and inorganic salts, under submerged aerobic conditions until substantial antitumor activity is imparted to said medium.

2. A process as in claim 1 wherein the roseolic acid is recovered from the fermentation broth.

3. The process of claim 2 wherein roseolic acid is recovered by adsorption on fuller's earth at pH 2.0 to 4.0 and elution therefrom with a pH 7.0–7.5 buffer.

4. The process of claim 3 wherein roseolic acid is further purified by adsorption on diethylaminoethylcellulose and elution therefrom by pH 7.0 phosphate buffer containing 4% sodium chloride.

5. The process of claim 4 wherein roseolic acid is further purified by concentrating and dialyzing the eluate, followed by adsorbing the non-dialyzable fraction on silicic acid-cellulose (1:1) and eluting roseolic acid therefrom with at least one phosphate buffer at a pH of about 2.0 to 7.0 and recovering roseolic acid therefrom.

6. The antitumor agent roseolic acid which is a dark red, non-dialyzable, weakly acidic, high molecular weight solid which melts at 185°–195° C. with decomposition, is insoluble in acetone, dioxane and the lower alcohols, slightly soluble in water and more soluble in aqueous sodium chloride solutions and glucose solutions; and which forms a red color in acidic and neutral solutions and a blue color in aqueous alkali, a magenta color in concentrated sulfuric acid, and a light yellow color with sodium hydrosulfite; which substance gives a negative reaction with ninhydrin and with ferric chloride and a positive Molisch test, and contains a reversible oxidation-reduction system; and which exhibits absorption maxima in the ultraviolet region of the spectrum when dissolved in pH 7.0 phosphate buffer at 256 and 500 m$\mu$ with $$E_{1\,cm.}^{1\%}$$

values of 190±10 and approximately 2, respectively; and when measured in a KBr pellet containing 1% of the product exhibits broad absorption maxima in the hydroxyl and carbonyl regions of the infrared spectrum; which substance when titrated potentiometrically with sodium hydroxide gives an equivalent weight of 1520±100; and which contains the elements carbon, hydrogen, nitrogen, phosphorus and oxygen in the following percentages by weight:

Carbon _____ 37.25
Hydrogen _____ 4.94
Nitrogen _____ 11.80
Phosphorus _____ 8.01
Oxygen (by difference) _____ 38.00 which substance when subjected to electrophoresis at pH 7.0 in 0.02 M phosphate buffer at 250–300 volts and 180±10 milliamperes migrates towards the anode as a single sharp band; and which, when heated in 1 N hydrochloric acid at 100° C., gives a red precipitate soluble in chloroform and almost insoluble in water; which red precipitate when crystallized from chloroform:methanol (1:1) melts at 238°–240° C. with decomposition and which gives a dark green color with alcoholic ferric chloride, a magenta color with concentrated sulfuric acid and a blue color with aqueous sodium hydroxide; and which precipitate possesses a reversible oxidation-reduction system; which precipitate exhibits absorption maxima in the ultraviolet region of the spectrum when dissolved in methanol at 232, 250, 285 and 500 mμ and $$E^{1\%}_{1\,cm.}$$

values of 935, 710, 180, and 310, respectively; and when measured in a KBr pellet containing 0.33% of the product, exhibits absorption maxima in the infrared region of the spectrum at 3436, 2899, 1712, 1610, 1575, 1439, 1408, 1374, 1351, 1285, 1256, 1236, 1206, 1188, 1124, 1088, 1073, 1040, 989, 943, 928, 921, 836, 813, 790 and 763 reciprocal centimeters as shown in the accompanying drawing; and which precipitate contains the elements carbon, oxygen and hydrogen in the following percentages by weight:

| | |
|---|---|
| Carbon | 63.35 |
| Hydrogen | 4.70 |
| Oxygen (by difference) | 31.95 | which precipitate has a molecular weight of 477; and when heated in 6 N hydrochloric acid gives a positive ninhydrin reaction.

7. An antitumor composition comprising a substantial proportion of a non-toxic carrier and at least about 0.0001% by weight of roseolic acid as defined in claim 6.

References Cited by the Examiner

Antimicrobial Agents and Chemotherapy 760–766 (May 1962).

ALBERT T. MEYERS, *Primary Examiner.*

JULIAN S. LEVITT, *Examiner.*

SAM ROSEN, *Assistant Examiner.*